United States Patent
Smith (10) Patent No.: US 9,565,078 B1
(45) Date of Patent: Feb. 7, 2017

(54) RECOMMENDED CONTENT TRAFFIC EXCHANGE

(71) Applicant: Google Inc., Mountain View, CA (US)

(72) Inventor: Colin David Smith, Chicago, IL (US)

(73) Assignee: Google Inc., Mountain View, CA (US)

( * ) Notice: Subject to any disclaimer, the term of this patent is extended or adjusted under 35 U.S.C. 154(b) by 322 days.

(21) Appl. No.: 14/019,825

(22) Filed: Sep. 6, 2013

(51) Int. Cl.
  *H04L 12/26* (2006.01)
  *G06Q 30/02* (2012.01)
  *H04L 12/725* (2013.01)
  *H04L 29/08* (2006.01)

(52) U.S. Cl.
  CPC ........... *H04L 43/04* (2013.01); *G06Q 30/0251* (2013.01); *H04L 43/0817* (2013.01); *H04L 45/308* (2013.01); *H04L 67/327* (2013.01)

(58) Field of Classification Search
  CPC .... H04L 43/04; H04L 43/0817; H04L 45/308; H04L 67/327; G06Q 30/0251
  See application file for complete search history.

(56) References Cited

U.S. PATENT DOCUMENTS

| | | | | |
|---|---|---|---|---|
| 7,961,611 B1 * | 6/2011 | Medhat | ............... | H04L 43/0876 370/230 |
| 2008/0103969 A1 * | 5/2008 | Flake | .................. | G06Q 30/0242 705/344 |
| 2008/0243634 A1 * | 10/2008 | Dworkin | ............ | G06Q 30/0601 705/26.1 |
| 2009/0144780 A1 * | 6/2009 | Toebes | ................... | G06Q 10/00 725/87 |
| 2009/0185486 A1 * | 7/2009 | Gerber | ................. | H04L 12/2602 370/234 |
| 2010/0293048 A1 * | 11/2010 | Singolda | ................ | G06Q 30/02 705/14.43 |
| 2011/0106630 A1 * | 5/2011 | Hegeman | ................ | G06Q 30/02 705/14.71 |
| 2011/0131098 A1 * | 6/2011 | Bafia | ................... | G06Q 30/0273 705/14.69 |
| 2011/0161479 A1 * | 6/2011 | Freishtat | ................. | G06Q 30/02 709/223 |
| 2012/0221557 A1 * | 8/2012 | Edmonds | .......... | G06F 17/30864 707/723 |
| 2013/0132191 A1 | 5/2013 | Galai et al. | | |
| 2014/0201350 A1 * | 7/2014 | Lakes | ..................... | H04L 67/02 709/223 |

OTHER PUBLICATIONS

AdSense, Wikipedia, Aug. 14, 2013, 6 pages.*
VigLink, Wikipedia, Jul. 15, 2013, 5 pages.*
Outbrain.com Amplify Frequently Asked Questions. http://www.outbrain.com/help/amplify/ Sep. 5, 2013.
Taboola.com Monetize Content. https://www.taboola.com/monetize-content Sep. 5, 2013.

* cited by examiner

*Primary Examiner* — Brian J Gillis
*Assistant Examiner* — Amy Ling
(74) *Attorney, Agent, or Firm* — Foley & Lardner LLP; John D. Lanza (57) ABSTRACT

A traffic exchange service may be configured to allow online content providers to exchange traffic via content recommendations from the service. The traffic exchange service may recommend content from one content provider in conjunction with content from another provider. The traffic exchange service may also operate to balance the amount of traffic to and from each content provider.

20 Claims, 4 Drawing Sheets

RECOMMENDED CONTENT TRAFFIC EXCHANGE

BACKGROUND

Online content may be received from various first-party or third-party sources. In general, first-party content refers to the primary online content requested or displayed by a user's device. For example, first-party content may be a webpage requested by the client or a stand-alone application (e.g., a video game, a chat program, etc.) running on the device. Third-party content, in contrast, refers to additional content that may be provided in conjunction with the first-party content. For example, third-party content may be a public service announcement or advertisement that appears in conjunction with a requested webpage (e.g., a search result webpage from a search engine, a webpage that includes an online article, a webpage of a social networking service, etc.) or within a stand-alone application (e.g., an advertisement within a game).

SUMMARY

One implementation disclosed herein is a method of recommending third-party content. The method includes determining, by one or more processors, an amount of traffic redirected to a first content provider from a plurality of content providers. The method also includes determining, by the one or more processors, an amount of traffic redirected from the first content provider to the plurality of content providers. The method further includes receiving, at the one or more processors, data indicative of a device identifier accessing content from one of the plurality of content providers. The method also includes identifying content from the first content provider as relevant to the device identifier. The method additionally includes determining that redirecting the device identifier to the identified content from the first content provider would further balance the determined amounts of traffic to and from the first content provider. The method yet further includes providing a link to the identified content from the first content provider in conjunction with the content from one of the plurality of content providers accessed by the device identifier.

Another implementation is a system for recommending third-party content comprising one or more processors configured to determine an amount of traffic redirected to a first content provider from a plurality of content providers. The one or more processors are also configured to determine an amount of traffic redirected from the first content provider to the plurality of content providers. The one or more processors are further configured to receive data indicative of a device identifier accessing content from one of the plurality of content providers. The one or more processors are also configured to identify content from the first content provider as relevant to the device identifier. The one or more processors are additionally configured to determine that redirecting the device identifier to the identified content from the first content provider would further balance the determined amounts of traffic to and from the first content provider. The one or more processors are also configured to provide a link to the identified content from the first content provider in conjunction with the content from one of the plurality of content providers accessed by the device identifier.

A further implementation is a computer-readable storage medium having machine instructions stored therein that are executable by one or more processors to cause the one or more processors to perform operations. The operations include determining an amount of traffic redirected to a first content provider from a plurality of content providers. The operations also include determining an amount of traffic redirected from the first content provider to the plurality of content providers. The operations further include receiving data indicative of a device identifier accessing content from one of the plurality of content providers. The operations also include identifying content from the first content provider as relevant to the device identifier. The operations yet further include determining that redirecting the device identifier to the identified content from the first content provider would further balance the determined amounts of traffic to and from the first content provider. The operations also include providing a link to the identified content from the first content provider in conjunction with the content from one of the plurality of content providers accessed by the device identifier.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to various aspects of the present disclosure, a first-party content provider may allow a traffic exchange service to recommend third-party content in conjunction with content from the first-party content provider. For example, assume that content from the first-party content provider is a webpage-based news article and that a related news article is available from a different content provider. The traffic exchange service may provide a hyperlink with the first news article as a recommendation that, when clicked, redirects the user's device to the related news article. In return for allowing traffic to be redirected away from the first-party provider's website, the traffic exchange service may operate to ensure that a balanced amount of traffic is also redirected back to the first-party content provider.

In some implementations, the traffic exchange service may be configured to recommend related third-party content to a user based on the estimated relevancy of the content to the user. In one implementation, the traffic exchange service may calculate a relevancy score for the third-party content and use the relevancy score to determine whether a link to the third-party content should be presented to the user. The relevancy score may be based on any number of different factors such as a topic of the first-party content the user is currently accessing, a history of the user's online actions (e.g., web browsing history, web browsing patterns, etc.), the user's estimated location, the user's estimated demographics, or the like. Thus, from the user's perspective, links provided by the traffic exchange service between content providers may enhance the user's browsing experience since the user is presented with relevant content directly without having to first search for the relevant content.

To ensure the user's privacy, the traffic exchange service may represent the user as a device identifier from which personally-identifiable information about the user cannot be determined by the service. The traffic exchange service may also be configured to allow the user to control what information is collected by the service and how that information is used by the service. Moreover, the traffic exchange service may be configured to generalize and/or estimate information about the user. For example, the traffic exchange service may generalize the location of a user (e.g., to a particular city, zip code, state, country, etc.), such that the precise location of the user cannot be used by the service.

In various implementations, the traffic exchange service may allow a content provider to specify device identifier characteristics desired by the content provider. For example, a content provider may prefer user traffic from males age 18-34 that are interested in outdoor sports. In some implementations, the content selection service may determine a value score for a given device identifier that represents the value of the corresponding user to a given content provider. In other words, different value scores for a device identifier may be computed by the traffic exchange service for different content providers, depending on how well the characteristics of the device identifier match the characteristics specified by a content provider. In one implementation, the traffic exchange service may use value scores to ensure that redirection traffic to and from a content provider maintain average value scores above a threshold amount. In other words, the traffic exchange service may also operate to ensure that traffic that a content provider values highly is not replaced by the traffic exchange service with traffic that the content provider does not value.

Figure 1:
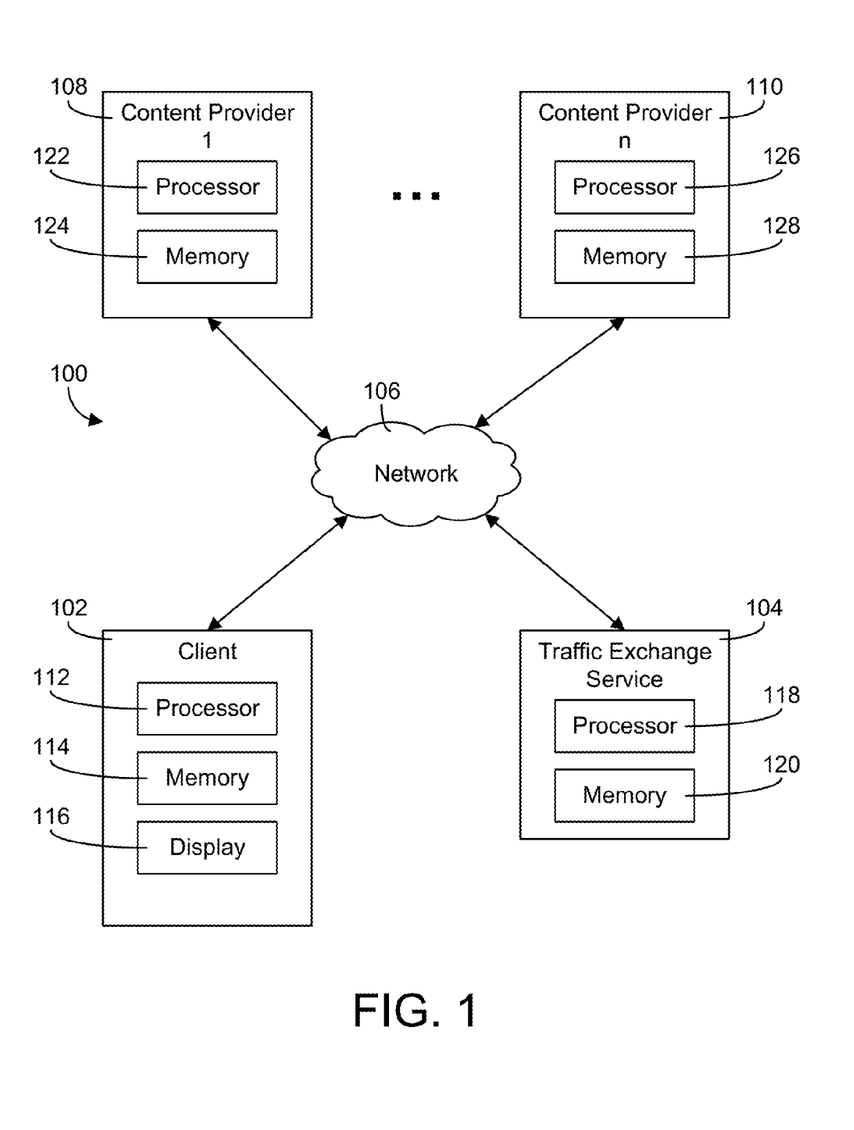
FIG. 1 is a block diagram of an implementation of a computer system in which third-party content is recommended in conjunction with first-party content.

Referring to FIG. 1, a block diagram is shown of an implementation of a computer system 100 in which third-party content is recommended in conjunction with first-party content. System 100 includes a client device 102 which communicates with other computing devices via a network 106. Client device 102 may execute a web browser or other application (e.g., a video game, a messenger program, a media player, a social networking application, etc.) to retrieve content from other devices over network 106. For example, client device 102 may communicate with any number of content providers 108-110 (e.g., a first content provider through nth content provider). Content providers 108-110 may provide webpage data and/or other content, such as images, video, and audio, to client device 102. Computer system 100 may also include a traffic exchange service 104 configured to recommend third-party content to client device 102 in conjunction with first-party content. For example, content provider 108 may provide a first-party webpage to client device 102 that includes a link to third-party content selected by traffic exchange service 104 and available from content provider 110.

Network 106 may be any form of computer network that relays information between client device 102, content providers 108-110, and traffic exchange service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). In some implementations, the type of client device 102 may be categorized as a mobile device, a desktop device (e.g., a device intended to remain stationary or configured to primarily access network 106 via a local area network), or another category of electronic device (e.g., tablet devices may be a third category, etc.). Client device 102 is shown to include a processor 112 and a memory 114. Memory 114 may store machine instructions that, when executed by processor 112 cause processor 112 to perform one or more of the operations described herein. Processor 112 may include one or more microprocessors, ASICs, FPGAs, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions.

Client device 102 may include one or more user interface devices. A user interface device may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other data received from content providers 108-110 and/or traffic exchange service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content providers 108-110 may be one or more electronic devices connected to network 106 that provide content to devices connected to network 106. For example, content providers 108-110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, other forms of electronic documents, and applications executable by client device 102. For example, content provider 108 may be an online search engine that provides search result data to client device 102 in response to a search query. In another example, content provider 110 may be a first-party web server that provides webpage data to client device 102 in response to a request for the webpage. Similar to client device 102, content providers 108, 110 may include processors 122, 126 and memories 124, 128, respectively, that store program instructions executable by processors 122, 126. For example, memory 124 of content provider 108 may include instructions such as web server software, FTP serving software, and other types of software that cause content provider 108 to provide content via network 106.

Traffic exchange service 104 may also be one or more electronic devices connected to network 106. Traffic exchange service 104 may be a computer server (e.g., FTP servers, file sharing servers, web servers, etc.) or a combination of servers (e.g., a data center, a cloud computing platform, etc.). Traffic exchange service 104 may have a processor 118 and a memory 120 that stores program instructions executable by processor 118. In various implementations, processor 118 may represent a collection of processors and memory 120 may represent a collection of memory storage devices.

Traffic exchange service 104 may be configured to provide a link to third-party content as a recommendation to the user of client device 102. In various cases, traffic exchange service 104 may provide hyperlinked images, hyperlinked text, or the like to client device 102 in conjunction with the first-party content accessed by client device 102. For example, assume that client device 102 accesses a first-party webpage served by content provider 108. Traffic exchange service 104 may determine that a third-party webpage served by content provider 110 is also of relevance to the user of client device 102 and provide a hyperlink to the third-party content in conjunction with the first-party webpage. Thus, the user of client device 102 may be redirected to the recommended content from the other content provider by clicking or otherwise selecting the link from traffic exchange service 104.

According to various implementations, content providers 108-110 may provide first-party webpage data to client device 102 that include one or more content tags. In general, a content tag refers to any piece of webpage code associated with the action of recommending additional content with a first-party webpage. For example, a content tag may define a slot on a webpage for content recommendations, a slot for out of page content recommendations (e.g., an interstitial slot), whether content recommendations should be loaded asynchronously or synchronously, whether the loading of content recommendations should be disabled on the webpage, whether content recommendations that loaded unsuccessfully should be refreshed, the network location of a content provider that provides the recommended content (e.g., content providers 108-110, traffic exchange service 104, etc.), a network location (e.g., a URL) associated with clicking on the content recommendation, how the content recommendation is to be rendered on a display, a command that causes client device 102 to set a browser cookie (e.g., via a pixel tag that sets a cookie via an image request), one or more keywords used to request the content recommendation from traffic exchange service 104, and other functions associated with recommending content. For example, content provider 108 may serve first-party webpage data to client device 102 that causes client device 102 to request a link to recommended third-party content from traffic exchange service 104.

Content recommended by traffic exchange service 104 may fall into a number of different categories. In many cases, traffic exchange service 104 may recommend content from a third-party content provider (e.g., content from a different provider than the provider of the first-party content accessed by client device 102). In further cases, traffic exchange service 104 may recommend internal content, i.e., other content from the same content provider. For example, traffic exchange service 104 may recommend a link to a different webpage article that is on the same website as the first-party content. In yet other cases, traffic exchange service 104 may recommend sponsored content. Sponsored content may differ from third-party and internal content in that the provider of the content agrees to pay for the opportunity to have the sponsored content presented to users. For example, sponsored content may be an advertisement, commercial, or the like.

In some implementations, traffic exchange service 104 may be configured to recommend content based on a device identifier associated with client device 102. In general, a device identifier refers to any form of data that may be used to represent a device or software that receives a content recommendation from traffic exchange service 104. In some implementations, a device identifier may be associated with one or more other device identifiers (e.g., a device identifier for a mobile device, a device identifier for a home computer, etc.). Device identifiers may include, but are not limited to, cookies, device serial numbers, user profile data, or network addresses. For example, a cookie set on client device 102 may be used to identify client device 102 to traffic exchange service 104.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how third-party content may be selected by traffic exchange service 104 and presented to the user. Certain data, such as a device identifier, may be anonymized in one or more ways before it is stored or used, so that personally identifiable information is removed when generating parameters (e.g., demographic parameters) used by traffic exchange service 104 to select third-party content. For example, a device identifier for client device 102 may be anonymized so that no personally identifiable information about its corresponding user can be determined by traffic exchange service 104 from it. In another example, a user's geographic location may be generalized where location information is obtained (such as to a city, ZIP code, or state level), so that a precise location of the user cannot be determined. Thus, the user of client device 102 may have control over how information is collected about him or her and used by traffic exchange service 104.

If the user of client device 102 has elected to allow traffic exchange service 104 to use information regarding himself or herself, traffic exchange service 104 may use history data associated with a device identifier to select relevant content for the corresponding user. History data may be any data associated with a device identifier that is indicative of an online event (e.g., visiting a webpage, interacting with presented content, conducting a search, making a purchase, downloading content, etc.). Based in part on the analyzed history data, traffic exchange service 104 may select third-party content to be recommended in conjunction with first-party content (e.g., as part of a displayed webpage, as a pop-up, within a video game, within another type of application, etc.). Additional data associated with a device identifier may include, but is not limited to, the device type of client device 102 (e.g., whether client device 102 is a desktop or mobile device), the location of client device 102, one or more estimated user demographics, or a search query generated by client device 102. For example, traffic exchange service 104 may select third-party content to be recommended as part of a first-party webpage from one of content providers 108-110.

Traffic exchange service 104 may analyze the history data associated with a device identifier to identify one or more topics that may be of interest to the corresponding user. For example, traffic exchange service 104 may perform text and/or image analysis on a webpage from content provider 108, to determine one or more topics of the webpage. In some implementations, a topic may correspond to a pre-defined interest category used by traffic exchange service 104. For example, a webpage devoted to the topic of golf may be classified under the interest category of sports. In some cases, interest categories used by traffic exchange service 104 may conform to a taxonomy (e.g., an interest category may be classified as falling under a broader interest category). For example, the interest category of golf may be /Sports/Golf, /Sports/Individual Sports/Golf, or under any other hierarchical category. Similarly, traffic exchange service 104 may analyze the content of a first-party webpage accessed by client device 102 to identify one or more topical categories for the webpage. For example, traffic exchange service 104 may use text or image recognition on the webpage to determine that the webpage is devoted to the topical category of /Sports/Golf.

Traffic exchange service 104 may receive history data indicative of one or more online events associated with a device identifier. In implementations in which a content tag causes client device 102 to request a content recommendation from traffic exchange service 104, such a request may include a device identifier for client device 102 and/or additional information (e.g., the webpage being loaded, the referring webpage, etc.). For example, traffic exchange service 104 may receive and store history data regarding whether or not a link to third-party content provided to client device 102 was selected using an interface device (e.g., the user of client device 102 clicked on a third-party hyperlink, third-party image, etc.). Traffic exchange service 104 may store such data to record a history of online events associated with a device identifier. In some cases, client device 102 may provide history data to traffic exchange service 104 without first executing a content tag. For example, client device 102 may periodically send history data to traffic exchange service 104 or may do so in response to receiving a command from a user interface device. In some implementations, traffic exchange service 104 may receive history data from content providers 108-110. For example, content provider 108 may store history data regarding web transactions with client device 102 and provide the history data to traffic exchange service 104.

In one implementation, traffic exchange service 104 may, for a given device identifier, calculate relevancy scores for different third-party content based on data associated with the device identifier (e.g., identified topics of interest, estimated parameter values, etc.). For example, assume that the topic of golf has been identified by traffic exchange service 104 as an interest category for the device identifier associated with client device 102. In such a case, traffic exchange service 104 may assign a high relevancy score to a webpage also related to golf and a low relevancy score to a webpage related to scrapbooking. In one implementation, traffic exchange service 104 may rank relevancy scores to determine which third-party content to recommend to client device 102. For example, traffic exchange service 104 may select the top n-number of pieces of third-party content for recommendation. In another implementation, traffic exchange service 104 may first determine which pieces of third-party content have relevancy scores above a threshold value and apply one or more filters to the resulting set of content for purposes of recommending content. In other words, the third-party content having the highest relevancy score for a device identifier may not be guaranteed to be recommended to the device identifier. However, whichever content is actually recommended by traffic exchange service 104 will still qualify as relevant to the user if its relevancy score is above the threshold value.

According to various implementations, traffic exchange service 104 may be configured to balance the flow of redirected traffic to and from a given content provider attributable to content recommendations from traffic exchange service 104. In one implementation, traffic exchange service 104 may determine whether the amount of traffic redirected from a content provider via third-party content recommendations is equal to the amount of traffic redirected to the content provider via third-party content recommendations. Based on this determination, traffic exchange service 104 may determine whether content from the provider is eligible as a recommendation on other providers' websites and/or whether content from other providers are eligible as recommendations on the provider's website. In other words, traffic exchange service 104 may recommend third-party content if it determines that the resulting redirection traffic would further balance the redirection traffic to and from the content provider.

Figure 2:
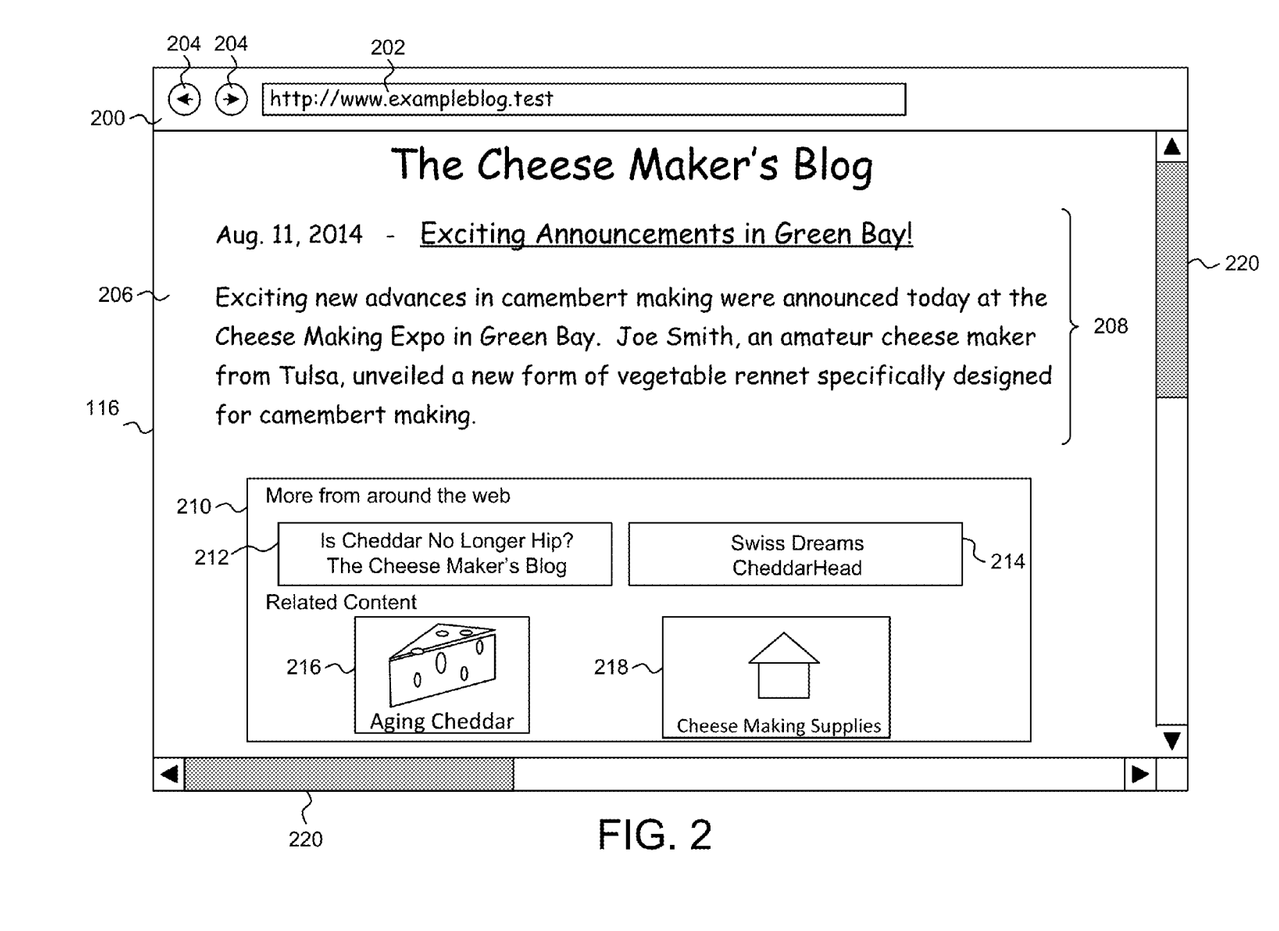
FIG. 2 is an illustration of an electronic display showing an implementation of a first-party webpage having links to recommended content.

Referring now to FIG. 2, an illustration is shown of electronic display 116 displaying an example first-party webpage 206. Electronic display 116 is in electronic communication with processor 112 which causes visual indicia to be displayed on electronic display 116. As shown, processor 112 may execute a web browser 200 stored in memory 114 of client device 102, to display indicia of content received by client device 102 via network 106. In other implementations, another application executed by client device 102 may incorporate some or all of the functionality described with regard to web browser 200 (e.g., a video game, a chat application, etc.).

Web browser 200 may operate by receiving input of a uniform resource locator (URL) via a field 202 from an input device (e.g., a pointing device, a keyboard, a touch screen, etc.). For example, the URL, http://www.exampleblog.test, may be entered into field 202. Processor 112 may use the inputted URL to request data from a content provider having a network address that corresponds to the entered URL. In other words, client device 102 may request first-party content accessible at the inputted URL. In response to the request, the content provider may return webpage data and/or other data to client device 102. Web browser 200 may analyze the returned data and cause visual indicia to be displayed by electronic display 116 based on the data.

In general, webpage data may include text, hyperlinks, layout information, and other data that may be used to provide the framework for the visual layout of first-party webpage 206. In some implementations, webpage data may be one or more files of webpage code written in a markup language, such as the hypertext markup language (HTML), extensible HTML (XHTML), extensible markup language (XML), or any other markup language. The webpage data may include data that specifies where indicia appear on first-party webpage 206, such as text 208.

Web browser 200 may include a number of navigational controls associated with first-party webpage 206. For example, web browser 200 may be configured to navigate forward and backwards between webpages in response to receiving commands via inputs 204 (e.g., a back button, a forward button, etc.). Web browser 200 may also include one or more scroll bars 220, which can be used to display parts of first-party webpage 206 that are currently off-screen. For example, first-party webpage 206 may be formatted to be larger than the screen of electronic display 116. In such a case, the one or more scroll bars 220 may be used to change the vertical and/or horizontal position of first-party webpage 206 on electronic display 116.

First-party webpage 206 may be devoted to one or more topics. For example, first-party webpage 206 may be devoted to the topic of cheese making. In particular, first-party webpage 206 may be an online article published on Aug. 11, 2014 regarding the latest cheese making expo in Green Bay, Wis., as indicated by text 208. In some implementations, a traffic exchange service, such as traffic exchange service 104 shown in FIG. 1, may analyze the contents of first-party webpage 206 to identify one or more topics. For example, traffic exchange service 104 may analyze text 208, any images located on webpage 206, any metadata associated with webpage 206, or the like, to identify first-party webpage 206 as related to the topic of cheese making.

In various implementations, traffic exchange service 104 may recommend other online content in conjunction with webpage 206. For example, the code for webpage 206 may include one or more content tags that define a slot 210 in which content recommendations may be placed. When webpage 206 is loaded by web browser 200, content tags in the webpage code that are associated with slot 210 may cause web browser 200 to request one or more content recommendations from traffic exchange service 104 to be presented in slot 210. The recommendation request may include information such as the identity or network address of webpage 206, the device identifier associated with client device 102, or other information that may be used by traffic exchange service 104 to recommend content to client device 102.

As shown, traffic exchange service 104 may recommend various types of content via slot 210 by providing recommendations 212-218 to client device 102. Recommendations 212-218 may include text, images, audio, video, etc. For example, recommendations 212, 214 may be text-only recommendations and recommendations 216, 218 may include both text and images. Content linked via recommendations 212-218 may also be webpages, applications, media files (e.g., videos, audio files, etc.), or any other form of content that may be accessed online.

In one case, traffic exchange service 104 may provide recommendation 212 for internal content in slot 210. In other words, recommendation 212 may be hyperlinked to another webpage article on "The Cheese Maker's Blog." In one implementation, the internal content may be located at the same domain as webpage 206. In another implementation, the internal content may be located at a different domain than webpage 206, but still served by the same content provider as webpage 206 (e.g., a content provider may serve a set of different websites).

Traffic exchange service 104 may provide recommendations 214, 216 for third-party content in slot 210. As shown, recommendation 214 may be a recommendation for an online article located at "Cheddar Head," a website served by a different content provider than the content provider of "The Cheese Maker's Blog." Similarly, recommendation 216 may be a recommendation for an online video located at "Aging Cheddar," another third-party website. Clicking or otherwise selecting either of recommendations 214, 216 via a user interface device may cause web browser 200 to be redirected to the corresponding third-party webpage and away from webpage 206.

Traffic exchange service 104 may also provide a recommendation 218 for sponsored third-party content. For example, recommendation 218 may be hyperlinked to an online merchant that sells cheese making supplies. In contrast to the third-party content associated with recommendations 214, 216, the provider of the content associated with recommendation 218 may agree to compensate traffic exchange service 104 for the ability to place recommendation 218 in slot 210. In some cases, traffic exchange service 104 may receive compensation based on whether or not the user of client device 102 interacts with recommendation 218. For example, traffic exchange service 104 may only receive compensation if the user clicks on recommendation 218 and is redirected to the merchant's website.

Traffic exchange service 104 may base the selection of recommendations 212-218 in part on relevancy scores associated with recommendations 212-218. In various implementations, traffic exchange service 104 may determine a relevancy score for recommended content based on an identified topic of webpage 206 (e.g., by analyzing text 208, based on a topic included in a content tag, based on metadata for webpage 206, etc.). Traffic exchange service 104 may also base the selection of recommendations 212-218 on a history of online actions associated with the device identifier for client device 102 (e.g., long-term topics of interest, short-term topics of interest, etc.). In some implementations, traffic exchange service 104 may base the selection of content recommendations 212-218 on estimated parameters associated with the device identifier, such as estimated demographics, an estimated location, etc. For example, if the estimated demographics associated with the device identifier of client device 102 match the typical demographics of visitors to the "CheddarHead" website, traffic exchange service 104 may increase the website's relevancy score, accordingly.

Traffic exchange service 104 may receive an indication of the user of client device 102 interacting with any of recommendations 212-218. For example, content tags embedded into the code for webpage 206 may cause web browser 200 to notify traffic exchange service 104 when one of recommendations 212-218 is clicked. In another implementation, traffic exchange service 104 may receive an indication that one of recommendations 212-218 was clicked from the content provider associated with the clicked recommendation. For example, the provider of "CheddarHead" may notify traffic exchange service 104 that client device 102 was redirected to its webpage via recommendation 214. Traffic exchange service 104 may use the received data to determine an overall amount of redirection traffic away from the provider of webpage 206 and/or an overall amount of redirection traffic to the provider of the content linked to the clicked recommendation.

Figure 3:
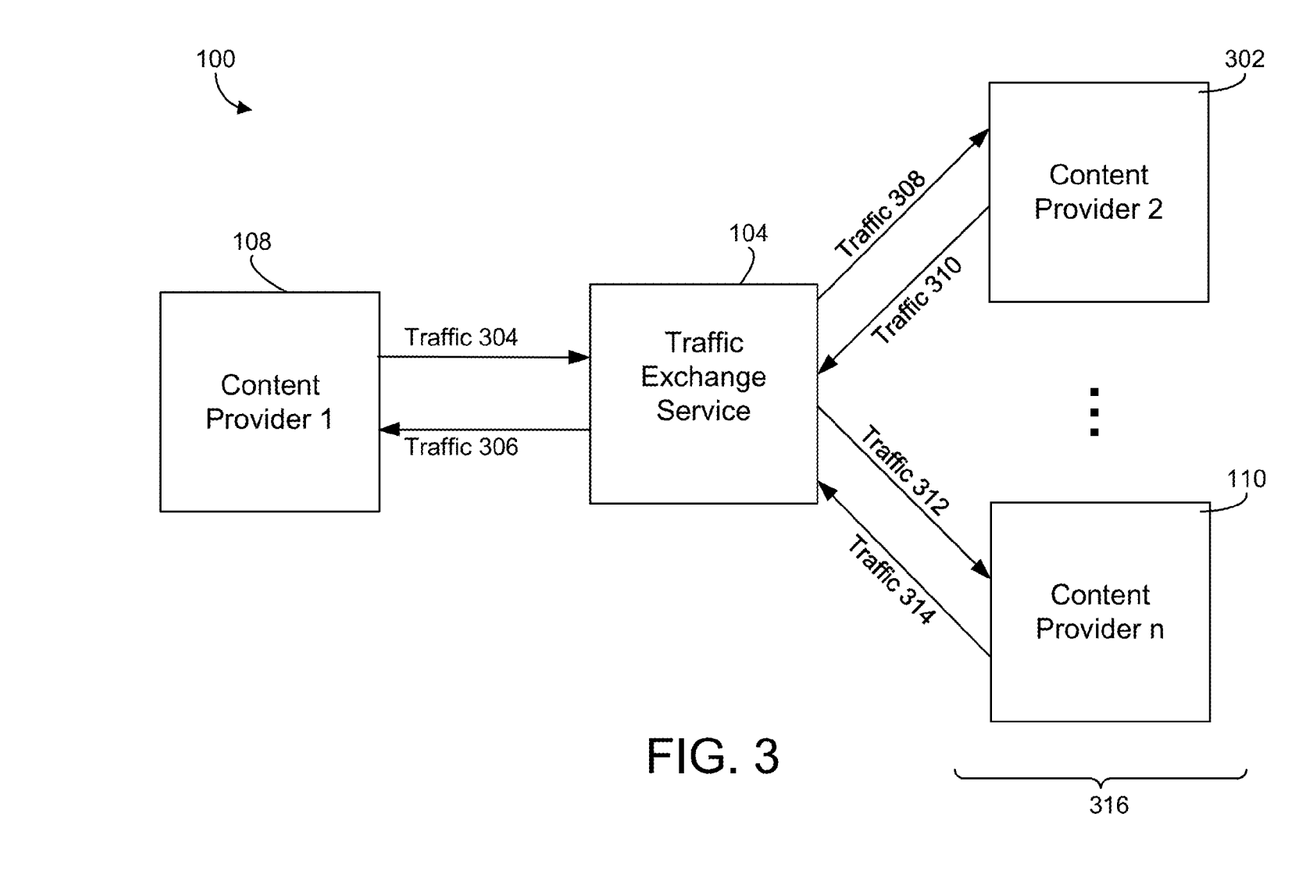
FIG. 3 is a detailed block diagram of the traffic exchange service of FIG. 1 balancing redirection traffic, according to various implementations.

Referring now to FIG. 3, a detailed block diagram is shown of the traffic exchange service 104 of FIG. 1 balancing redirection traffic, according to various implementations. As shown, traffic exchange service 104 may provide one or more content recommendations for content from another provider with that of a first content provider. For example, traffic exchange service 104 may provide a content recommendation in conjunction with first-party content from content provider 108. The recommendation may link to content provided by any of a set 316 of other content providers. Set 316 may include any number of other content providers, according to various implementations. For example, set 316 may include a second content provider 302 through an nth content provider 110. Traffic exchange service 104 may perform similar operations with respect to each of the content providers participating in traffic exchanges. In other words, for each of the content providers in set 316, traffic exchange service 104 may also provide content recommendations to content from another provider.

Traffic exchange service 104 may determine an amount of redirection traffic from each content provider participating in the traffic exchange. For example, traffic exchange service 104 may determine an amount of redirection traffic 304 from content provider 108 corresponding to users having been redirected to other content providers via content recommendation links. Similarly, traffic exchange service 104 may determine an amount of redirection traffic 310 from content provider 302, an amount of redirection traffic 314 from content provider 110, and an amount of redirection traffic from each of the other content providers in set 316. According to various implementations, the redirection traffic analyzed by traffic exchange service 104 may correspond to traffic attributable to non-sponsored, external content recommendations.

Traffic exchange service 104 may determine an amount of redirection traffic to each content provider participating in the traffic exchange. For example, traffic exchange service 104 may determine an amount of redirection traffic 306 received by content provider 108 from the other content providers in set 316. Similarly, traffic exchange service 104 may determine an amount of redirection traffic 310 to content provider 302, an amount of redirection traffic 314 to content provider 110, and the amount of redirection traffic to each of the other content providers in set 316 attributable to the traffic exchange.

In one implementation, traffic exchange service 104 may receive indications of client devices having been redirected to other content providers via content recommendations from traffic exchange service 104. For example, assume that traffic exchange service 104 provides a link to content from content provider 302 as a recommendation with first-party content from content provider 108. If the user of the client device clicks on the recommendation and is redirected to content provider 302, traffic exchange service 104 may receive an indication of this redirection. Traffic exchange service 104 may use the received redirection data to determine the traffic amounts 304-314 for the various content providers participating in the exchange.

Traffic amounts 304-314 may be calculated by traffic exchange service 104 over any period of time. For example, traffic amounts 304-314 may be daily, weekly, monthly, yearly, or total redirection traffic amounts for the content providers in computer system 100. In various implementations, traffic amounts 304-314 may be raw traffic amounts, weighted traffic amounts, or average traffic amounts. For example, traffic amounts 304-314 may be daily running averages of traffic amounts from the past thirty days. In another example, traffic amounts 304-314 may be weighted averages of redirection traffic.

According to various implementations, traffic exchange service 104 may perform certain operations to further balance the amount of redirection traffic to and from each of the content providers in system 100. For example, traffic exchange service 104 may operate to ensure that the amount of traffic 304 redirected away from content provider 108 is equal to the amount of redirection traffic 306 received by content provider 108. In some cases, traffic exchange service 104 may compare the difference between the in and out redirection traffic for a content provider to one or more threshold values. For example, traffic exchange service 104 may determine whether redirection traffic amount 304 outweighs redirection traffic amount 306 for content provider 108 by a threshold amount or vice-versa.

If the amount of redirection traffic received by a content provider outweighs its outgoing redirection traffic by a threshold amount, traffic exchange service 104 may take measures to rebalance the two traffic amounts. In one implementation, traffic exchange service 104 may lower the relevancy scores of the provider's content until this condition is rectified. By lowering the relevancy score of the provider's content, fewer recommendation links to the content provider will be generated by traffic exchange service 104. In another implementation, traffic exchange service 104 may increase the number of content recommendation links provided in conjunction with the provider's content. For example, traffic exchange service 104 may provide more third-party content links in lieu of sponsored content links with the content from content provider 108 until the balance between redirection traffic amounts 304-306 is within a given threshold level.

Traffic exchange service 104 may also take certain measures to rebalance a content provider's redirection traffic amounts, if the outgoing redirection traffic outweighs the incoming traffic by a threshold amount. In one implementation, traffic exchange service 104 may increase the relevancy score for the provider's content, thereby increasing the number of content recommendation links generated to the provider's content. In such a case, the amount of increase to the relevancy score may be selected such that the relevancy of the provider's content to a user is maintained. In other words, traffic exchange service 104 may not increase a provider's relevancy score to the point that irrelevant content is recommended to a user. For example, traffic exchange service may increase a content provider's relevancy score by 10%, if the provider's traffic is unbalanced. In another implementation, traffic exchange service 104 may automatically flag a provider's content for recommendation, if the provider's content is determined to be within a set of relevant content. For example, traffic exchange service 104 may first compare a provider's relevancy score to a threshold to determine whether the provider's content may be deemed relevant to a given device identifier. If so, traffic exchange service 104 may then give preference to the provider's content when selecting which content is to be recommended from among the content deemed relevant. In yet another implementation, traffic exchange service 104 may decrease the number of third-party content recommendations provided in conjunction with the provider's content. Instead, traffic exchange service 104 may provide more internal content recommendations, more sponsored content recommendations, or simply not provide a non-sponsored, third-party content recommendation at all.

According to various implementations, traffic exchange service 104 may operate to balance value scores associated with traffic amounts 304-314. The value scores may represent the value of a given device identifier to a content provider in system 100. For example, each of the content providers in system 100 may submit a set of device identifier characteristics (estimated demographics, device locations, referring content providers, etc.) that are desired by the content provider. Based on how well the characteristics associated with a device identifier match those specified by a content provider, traffic exchange service 104 may calculate a value score for the device identifier from the perspective of the content provider. In some cases, each characteristic may be weighted separately and the complete set of weightings may be normalized and multiplied to determine the overall value score for the device identifier. For example, traffic exchange service may determine a value score ranging from zero to one that represents how well the characteristics of a device identifier match those specified by a content provider.

Since each content provider in system 100 may desire different device identifier characteristics, it is possible that any given device identifier is both highly valuable to one content provider and of low value to a different provider. For example, assume that a given device identifier is estimated to represent a male user between the ages of 25-34, that content provider 108 has specified that it wants to receive traffic within this demographic, and that content provider 302 has instead specified that it wishes to receive traffic estimated to be from females ages 65+. In such a case, if the device identifier is redirected from content provider 302 to content provider 108, content provider 302 has lost a low value device identifier and content provider 108 has gained a high value device identifier.

Traffic exchange service 104 may be configured to use a credit and debit system with respect to value scores, in one implementation. For example, for each high value device identifier lost by a content provider, it may be eligible to receive one device identifier having a comparable value score. In some implementations, traffic amounts 304-314 may be weighted using value scores and balanced accordingly by traffic exchange service 104. For example, a content provider receiving ten low value device identifiers may be treated as the equivalent of the content provider receiving one high value device identifier for purposes of balancing traffic amounts. In other implementations, traffic exchange service 104 may operate to balance the actual in and out traffic amounts for a provider, while using value scores to select which device identifiers are redirected to and from the provider. In some cases, traffic exchange service 104 may impose a rule such that, at minimum, a content provider receives the same number of high value device identifiers as it loses (i.e., a content provider may receive more high value device identifiers than it loses, but is guaranteed not to experience a net loss).

In one implementation, traffic exchange service 104 may only use value scores to favor the recommendation of certain content after the content is deemed relevant to the device identifier. In other words, even if a device identifier has a high value score for a content provider, traffic exchange service 104 may not recommend the provider's content to the device identifier if the relevancy score for the content is below a threshold amount. Thus, from the perspective of a user, content recommended by traffic exchange service 104 will always be of relevance to the user.

In most implementations, traffic exchange service 104 allows the content providers in system 100 to exchange redirection traffic without compensating traffic exchange service 104 (e.g., traffic exchange service 104 is a free service). However, it is contemplated in one implementation that a content provider may pay traffic exchange service 104 to increase the number of high value device identifiers routed to content provider in relation to the number of high value device identifiers redirected away from the provider. In yet another implementation, traffic exchange service may receive compensation from the content providers in system 100 on a subscription basis. For example, each content provider may pay for the ability to exchange traffic via traffic exchange service 104, but may not be able to pay for specific types of traffic that it receives.

Figure 4:
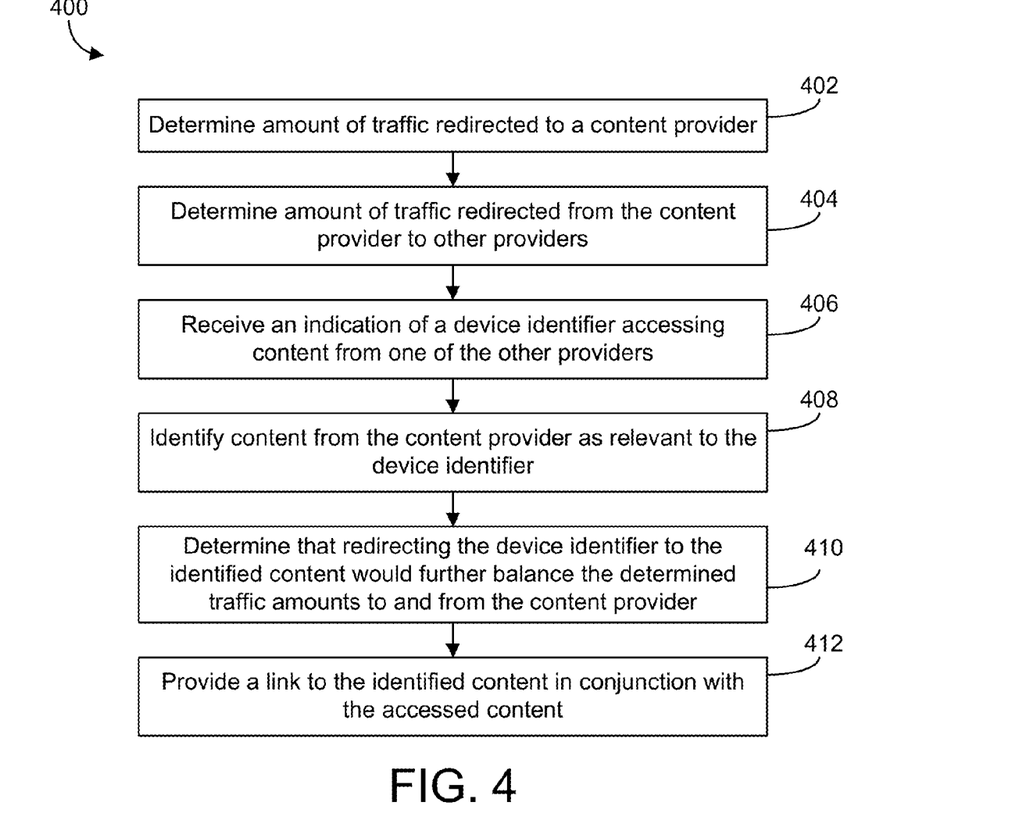
FIG. 4 is a flow diagram of the steps taken in one implementation of a process for recommending third-party content via a traffic exchange service.

Referring now to FIG. 4, a flow diagram is shown of an implementation of a process 400 for recommending third-party content via a traffic exchange service. Process 400 generally includes determining an amount of traffic redirected to a content provider (step 402), determining an amount of traffic redirected from the content provider to other providers (step 404), receiving an indication of a device identifier accessing content from one of the other providers (step 406), identifying content from the content provider as relevant to the device identifier (step 408), determining that redirecting the device identifier to the identified content would further balance the redirected traffic of its provider (step 410), and providing a link to the content in conjunction with the accessed content (step 412). For example, process 400 may be implemented by traffic exchange service 104 shown in detail in FIG. 3.

Still referring to FIG. 4 and in more detail, process 400 includes determining an amount of traffic redirected to a content provider (step 402). In one implementation, for example, traffic exchange service 104 may receive data indicative of whether a client device has been redirected to the content provider via a third-party content recommendation provided by traffic exchange service 104 (e.g., a non-sponsored content recommendation to content from a third-party content provider). For example, a content tag on a webpage may cause the client device to notify traffic exchange service 104 if the content recommendation is clicked and the client device is redirected to content from the content provider. In other cases, traffic exchange service 104 may receive an indication of the redirection from another source, such as the third-party content provider, another traffic monitoring service, or the like.

Using received data regarding traffic redirections, a traffic exchange service may aggregate the redirection data to determine an amount of traffic redirected to the content provider by the service. The service may use the received data from any given period of time, such as in the past day, week, month, year, overall, or any other period of time. In some implementations, the amount of traffic redirected to the content provider may be a sum of all device identifiers redirected to the content provider via content recommendations from the service. In other implementations, the amount of traffic may be simple averages, weighted averages, running averages, etc. over one or more time periods. The traffic exchange service may also weight each redirection when determining the amount of traffic to the content provider. For example, the service may weight a traffic redirection using a value score representing the value of the redirected device identifier to the content provider.

Yet still referring to FIG. 4 and in more detail, process 400 includes determining an amount of traffic redirected from the content provider to other providers (step 404). For example, as shown in FIG. 3, traffic exchange service 104 may determine an amount of traffic 304 from content provider 108 that corresponds to an amount of traffic redirected away from content provider 108 via third-party content recommendations provided by traffic exchange service 104 (e.g., non-sponsored content recommendations). The traffic itself may be divided any way by traffic exchange service 104 among the set 316 of other content providers.

Similar to the amount of redirection traffic received by the content provider, the amount of redirection traffic from the content provider may be determined by the traffic exchange service by aggregating data indicative of client devices having been redirected to other content providers via third-party content recommendations. According to various implementations, the service may aggregate the redirection data from one or more time periods to determine the amount of redirection traffic received by the content provider. In various implementations, the traffic exchange service may also determine the amount of redirection traffic received by the content provider by determining a sum of the redirections, by calculating a statistic (e.g., a simple average, a weighted average, a running average, etc.), by applying a weighting to each redirection (e.g., using a value score for the device identifier), combinations thereof, or using any other technique.

Still referring to FIG. 4, process 400 includes receiving an indication of a device identifier accessing content from one of the other providers (step 406). For example, as shown in FIG. 1, traffic exchange service 104 may receive an indication that the device identifier for client device 102 has accessed content from content provider 110. The indication may be received from the accessing client device itself, the accessed content provider, or from another online traffic monitoring service. In one implementation, the accessed content may include a content tag that, when processed by the client device, causes the client device to request one or more recommendations from the traffic exchange service. Such a request may alert the traffic exchange service to the client device accessing the content from the other content provider.

Yet still referring to FIG. 4, process 400 includes identifying content from the content provider as relevant to the device identifier (step 408). In various implementations, a relevancy score may be calculated for the content and used to determine whether the content is relevant to the device identifier. The relevancy score may represent the relevancy of the content to the device identifier. Thus, the content may have different relevancy scores for each device identifier. In some implementations, the relevancy scores may be calculated by the traffic exchange service using one or more topics of the first-party content accessed by the device identifier, estimated characteristics associated with the device identifier (e.g., estimated demographics, an estimated location, etc.), interest categories identified using a history of online actions (e.g., long-term or short-term interest categories based on the browsing history of the device identifier), data available via a social networking service, combinations thereof, or from any other source. In one implementation, the traffic exchange service always recommends the content having the highest relevancy score. In another implementation, the traffic exchange service first determines whether the content's relevancy score is high enough to classify the content as relevant (e.g. the relevancy score is above a threshold value). If so, the traffic exchange service may recommend content selected from a pool of content deemed relevant. Thus, the user may always receive content that is relevant to him or her.

Yet still referring to FIG. 4, process 400 includes determining that redirecting the device identifier to the identified content would further balance the traffic of its provider (step 410). In various implementations, the traffic exchange service may compare the amount of traffic redirected by the service to the content provider to the amount of traffic redirected away from the content provider by the service. For example, as shown in FIG. 3, traffic exchange service 104 may compare traffic amounts 304 and 306 to determine how well the two traffic amounts are balanced. If, for example, the amount of redirection traffic from the content provider is greater than the amount of redirection traffic to the content provider, the traffic exchange service may determine that redirecting the device identifier to the content provider's content would further balance the provider's redirected traffic.

According to various implementations, a traffic exchange service may perform any number of operations to further balance the redirected traffic to an from a content provider (e.g., the redirected traffic attributable to the service recommending non-sponsored, third-party content). In one implementation, the service may decrease the relevancy score for the provider's content, if the amount of traffic received by the content provider outweighs the traffic from the provider by a threshold amount, thereby decreasing the number of recommendations to the provider's content. In another implementation, the traffic exchange service may increase the number of non-sponsored, third-party content recommendations placed by the service in conjunction with the provider's content. For example, the service may decrease the number of displayed advertisements in favor or recommending more non-sponsored, third-party content. In some implementations, the traffic exchange service may increase the relevancy score for a provider's content, if the amount of traffic from the provider outweighs the amount of traffic to the provider by a threshold amount. In one implementation, the increase to the relevancy score may be selected such that provider's content is still relevant to the user but simply receives a greater chance of appearing as a recommendation. In a further implementation, the traffic exchange service 104 may decrease the number of non-sponsored, third-party content recommendation provided in conjunction with the provider's content, if the amount of traffic from the provider outweighs the amount of traffic to the provider by a threshold amount. For example, the traffic exchange service 104 may recommend more sponsored content, more internal content (e.g., other content from the content provider), or the like, in lieu of recommending non-sponsored, third-party content.

Still referring to FIG. 4, process 400 includes providing a link to the identified content in conjunction with the accessed content (step 412). For example, traffic exchange service 104 shown in FIG. 3 may provide a link to content from content provider 108 in conjunction with content from content provider 302. The link may be a hyperlink, in some cases, and may include accompanying text, one or more images, audio, video, or other indicia that identifies the recommended content, the provider of the content, or the like.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of recommending third-party content, the method comprising:
    determining, by a traffic exchange service executing on one or more servers configured to provide links to online content of a plurality of content publishers for display on information resources, a first amount of data traffic corresponding to content from a first content provider that is previously accessed via respective links provided on information resources of a plurality of second content providers;
    determining, by the one or more servers, a second amount of data traffic corresponding to content from the plurality of second content providers previously accessed via respective links provided on one or more information resources of the first content provider;
    receiving, by the one or more servers, a request for content to be displayed on a client device associated with a device identifier, the client device accessing an information resource of one of the plurality of second content providers;
    identifying, by the one or more servers, one or more content items of the first content provider as relevant to the device identifier;
    determining, by the one or more servers, that a difference between the second amount of data traffic and the first amount of data traffic is greater than a threshold value; and
    providing, by the one or more servers, a link to the identified one or more content items of the first content provider for display in a content slot on the information resource of the one of the plurality of second content providers responsive to determining that the difference between the second amount of data traffic and the first amount of data traffic is greater than the threshold value.

2. The method of claim 1, wherein identifying the one or more content items of the first content provider as relevant to the device identifier comprises:
    matching a topic of the accessed information resource of the one of the plurality of second content providers to a topic of the one or more content items of the first content provider.

3. The method of claim 2, wherein identifying the one or more content items of the first content provider as relevant to the device identifier comprises:
    retrieving a history of online actions associated with the device identifier;
    identifying a topic from the history of online actions associated with the device identifier; and
    matching the topic identified from the history of online actions to the topic of the one or more content items of the first content provider.

4. The method of claim 1, further comprising:
    adjusting a relevancy score associated with content of the first content provider responsive to determining that the difference between the second amount of data traffic and the first amount of data traffic is greater than the threshold value, adjusting the relevancy score causing less links of content items of the plurality of second content providers to be provided for display on information resources of the first content provider.

5. The method of claim 1, further comprising:
    providing an advertisement or a link to a content item of a content provider among the plurality of second content providers for display on another client device on an information resource of the first content provider based on a determination that a difference between the first amount of data traffic and the second amount of data traffic is greater than the threshold value.

6. The method of claim 1, further comprising:
receiving a set of device identifier characteristics from the first content provider;
assigning a value score to the device identifier based on the set of device identifier characteristics; and
debiting or crediting the first content provider using the value score in response to providing the link to the identified one or more content items of the first content provider for display in the content slot of the information resource of the one of the plurality of second content providers.

7. The method of claim 1, wherein the identified one or more content items of the first content provider include non-sponsored content.

8. A system for recommending third-party content comprising one or more processors configured to:
determine a first amount of data traffic corresponding to content from a first content provider that is previously accessed via respective links provided on information resources of a plurality of second content providers;
determine a second amount of data traffic corresponding to content from the plurality of second content providers previously accessed via respective links provided on one or more information resources of the first content provider;
receive a request for content to be displayed on a client device associated with a device identifier, the client device accessing an information resource of one of the plurality of second content providers;
identify one or more content items of the first content provider as relevant to the device identifier;
determine that the second amount of data traffic is greater than the first amount of data traffic by comparing the first number of content items amount of data traffic to the second amount of data traffic; and
provide a link to the identified one or more content items of the first content provider for display in a content slot on the information resource of the one of the plurality of second content providers responsive to determining that the second amount of data traffic is greater than the first amount of data traffic.

9. The system of claim 8, wherein the one or more processors identify the one or more content items of the first content provider as relevant to the device identifier by matching a topic of the accessed information resource of the one of the plurality of second content providers to a topic of the one or more content items of the first content provider.

10. The system of claim 9, wherein the one or more processors identify the one or more content items of the first content provider as relevant to the device identifier by:
retrieving a history of online actions associated with the device identifier;
identifying a topic from the history of online actions associated with the device identifier; and
matching the topic identified from the history of online actions to the topic of the one or more content items of the first content provider.

11. The system of claim 8, wherein the one or more processors are configured to adjust a relevancy score associated with content of the first content provider responsive to determining that the second amount of data traffic is greater than the first amount of data traffic, adjusting the relevancy score causing less links of content items of the plurality of second content providers to be provided for display on information resources of the first content provider.

12. The system of claim 8, wherein the one or more processors are configured to provide an advertisement or a link to a content item of content provider among the plurality of second content providers for display on another client device on an information resource of the first content provider based on a determination that the first amount of data traffic is greater than the second amount of data traffic.

13. The system of claim 8, wherein the one or more processors are configured to:
receive a set of device identifier characteristics from the first content provider;
assign a value score to the device identifier based on the set of device identifier characteristics; and
debit or credit the first content provider using the value score in response to providing the link to the identified one or more content items of the first content provider for display in the content slot of the information resource of the one of the plurality of second content providers.

14. The system of claim 8, wherein the identified one or more content items of the content provider represent non-sponsored content.

15. A computer-readable storage medium having machine instructions stored therein that are executable by one or more processors to cause the one or more processors to perform operations comprising:
determining a first amount of data traffic corresponding to content from a first content provider that is previously accessed via respective links provided on information resources of a plurality of second content providers;
determining a second amount of data traffic corresponding to content of the plurality of second content providers previously accessed via respective links on one or more information resources of the first content provider;
receiving a request for content to be displayed on a client device associated with a device identifier, the client device accessing an information resource of one of the plurality of second content providers;
identifying one or more content items of the first content provider as relevant to the device identifier;
determining that the second amount of data traffic is greater than the first amount of data traffic by comparing the first amount of data traffic to the second amount of data traffic; and
providing a link to the identified one or more content items of the first content provider for display in a content slot on the information resource of the one of the plurality of second content providers responsive to determining that the second amount of data traffic is greater than the first amount of data traffic.

16. The computer-readable storage medium of claim 15, wherein identifying the one or more content items of the first content provider as relevant to the device identifier comprises:
matching a topic of the accessed information resource of the one of the plurality of second content providers to a topic of the one or more content items of the first content provider.

17. The computer-readable storage medium of claim 16, wherein identifying the one or more content items of the first content provider as relevant to the device identifier comprises:
retrieving a history of online actions associated with the device identifier;

identifying a topic from the history of online actions associated with the device identifier; and matching the topic identified from the history of online actions to the topic of the one or more content items of the first content provider.

18. The computer-readable storage medium of claim 15, wherein the operations further comprise:

adjusting a relevancy score associated with content of the first content provider responsive to determining that the second amount of data traffic is greater than the first amount of data traffic, adjusting the relevancy score causing less links of content items of the plurality of second content providers to be provided for display on information resources of the first content provider.

19. The computer-readable storage medium of claim 15, wherein the operations further comprise:

providing an advertisement or a link to a content item of a content provider among the plurality of second content providers for display on another client device on an information resource of the first content provider based on a determination that the first amount of data traffic is greater than the second amount of data traffic.

20. The computer-readable storage medium of claim 15, wherein the operations further comprise:

receiving a set of device identifier characteristics from the first content provider;

assigning a value score to the device identifier based on the set of device identifier characteristics; and debiting or crediting the first content provider using the value score in response to providing the link to the one or more content items of the first content provider for display in the content slot of the information resource of the one of the plurality of second content providers.

\* \* \* \* \*